(12) United States Patent
Kida et al.

(10) Patent No.: US 8,289,283 B2
(45) Date of Patent: Oct. 16, 2012

(54) LANGUAGE INPUT INTERFACE ON A DEVICE

(75) Inventors: Yasuo Kida, Palo Alto, CA (US); Ken Kocienda, Sunnyvale, CA (US); Elizabeth Caroline Furches, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 852 days.

(21) Appl. No.: 12/042,309

(22) Filed: Mar. 4, 2008

(65) Prior Publication Data
US 2009/0225041 A1   Sep. 10, 2009

(51) Int. Cl.
*G06F 3/041* (2006.01)

(52) U.S. Cl. .................................... 345/173; 715/700

(58) Field of Classification Search .......... 345/173–182; 178/18.01; 200/512; 340/407.1
See application file for complete search history.

(56) References Cited

U.S. PATENT DOCUMENTS

| | | | |
|---|---|---|---|
| 4,974,191 A | 11/1990 | Amirghodsi et al. |
| 5,128,672 A | 7/1992 | Kaehler |
| 5,282,265 A | 1/1994 | Rohra Suda et al. |
| 5,379,057 A | 1/1995 | Clough et al. |
| 5,386,556 A | 1/1995 | Hedin et al. |
| 5,434,777 A | 7/1995 | Luciw |
| 5,479,488 A | 12/1995 | Lennig et al. |
| 5,535,119 A | 7/1996 | Ito et al. |
| 5,577,241 A | 11/1996 | Spencer |
| 5,608,624 A | 3/1997 | Luciw |
| 5,675,362 A | 10/1997 | Clough et al. |
| 5,682,539 A | 10/1997 | Conrad et al. |
| 5,727,950 A | 3/1998 | Cook et al. |
| 5,748,974 A | 5/1998 | Johnson |
| 5,794,050 A | 8/1998 | Dahlgren et al. |
| 5,826,261 A | 10/1998 | Spencer |
| 5,895,466 A | 4/1999 | Goldberg et al. |
| 5,899,972 A | 5/1999 | Miyazawa et al. |
| 5,915,249 A | 6/1999 | Spencer |
| 5,959,629 A * | 9/1999 | Masui ........................ 715/808 |
| 5,987,404 A | 11/1999 | Della Pietra et al. |
| 6,052,656 A | 4/2000 | Suda et al. |

(Continued)

FOREIGN PATENT DOCUMENTS

CN   1949158 A   4/2007

(Continued)

OTHER PUBLICATIONS

T. Masui, "An Efficient Text Input Method for Pen-based Computers," Proceedings of the ACM Conference on Human Factors in Computing System (CHI '98), Apr. 1998, ACM press, pp. 328-335.

(Continued)

*Primary Examiner* — Kevin M Nguyen
*Assistant Examiner* — Kenneth B Lee, Jr.
(74) *Attorney, Agent, or Firm* — Morgan, Lewis & Bockius LLP

(57) ABSTRACT

Methods, systems, and apparatus, including computer program products, for inputting text. A virtual keyboard is presented in a first region of a touch sensitive display of a device. An input representing a phonetic string is received on the virtual keyboard. The entered phonetic string is presented in a second region of the touch sensitive display. One or more candidates are identified based on the phonetic string. At least a subset of the candidates is presented. An input selecting one of the candidates is received. The entered phonetic string is replaced with the selected candidate.

28 Claims, 9 Drawing Sheets

U.S. PATENT DOCUMENTS

| | | |
|---|---|---|
| 6,081,750 A | 6/2000 | Hoffberg et al. |
| 6,088,731 A | 7/2000 | Kiraly et al. |
| 6,115,053 A | 9/2000 | Perlin |
| 6,144,938 A | 11/2000 | Surace et al. |
| 6,188,999 B1 | 2/2001 | Moody |
| 6,233,559 B1 | 5/2001 | Balakrishnan |
| 6,278,968 B1 | 8/2001 | Franz et al. |
| 6,323,846 B1 | 11/2001 | Westerman et al. |
| 6,334,103 B1 | 12/2001 | Surace et al. |
| 6,421,672 B1 | 7/2002 | McAllister et al. |
| 6,434,524 B1 | 8/2002 | Weber |
| 6,446,076 B1 | 9/2002 | Burkey et al. |
| 6,453,292 B2 | 9/2002 | Ramaswamy et al. |
| 6,499,013 B1 | 12/2002 | Weber |
| 6,501,937 B1 | 12/2002 | Ho et al. |
| 6,513,063 B1 | 1/2003 | Julia et al. |
| 6,523,061 B1 | 2/2003 | Halverson et al. |
| 6,526,395 B1 | 2/2003 | Morris |
| 6,532,444 B1 | 3/2003 | Weber |
| 6,567,549 B1 * | 5/2003 | Marianetti et al. ............ 382/189 |
| 6,570,557 B1 | 5/2003 | Westerman et al. |
| 6,598,039 B1 | 7/2003 | Livowsky |
| 6,601,026 B2 | 7/2003 | Appelt et al. |
| 6,615,172 B1 | 9/2003 | Bennett et al. |
| 6,633,846 B1 | 10/2003 | Bennett et al. |
| 6,650,735 B2 | 11/2003 | Burton et al. |
| 6,661,409 B2 | 12/2003 | Demartines et al. |
| 6,665,640 B1 | 12/2003 | Bennett et al. |
| 6,677,932 B1 | 1/2004 | Westerman |
| 6,691,111 B2 | 2/2004 | Lazaridis et al. |
| 6,691,151 B1 | 2/2004 | Cheyer et al. |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,179 B1 | 7/2004 | Shiau et al. |
| 6,778,951 B1 | 8/2004 | Contractor |
| 6,792,082 B1 | 9/2004 | Levine |
| 6,807,574 B1 | 10/2004 | Partovi et al. |
| 6,842,767 B1 | 1/2005 | Partovi et al. |
| 6,851,115 B1 | 2/2005 | Cheyer et al. |
| 6,859,931 B1 | 2/2005 | Cheyer et al. |
| 6,888,536 B2 | 5/2005 | Westerman et al. |
| 6,895,380 B2 | 5/2005 | Sepe, Jr. |
| 6,895,558 B1 | 5/2005 | Loveland |
| 6,928,614 B1 | 8/2005 | Everhart |
| 6,937,975 B1 | 8/2005 | Elworthy |
| 6,964,023 B2 | 11/2005 | Maes et al. |
| 6,980,949 B2 | 12/2005 | Ford |
| 6,996,531 B2 | 2/2006 | Korall et al. |
| 7,027,974 B1 | 4/2006 | Busch et al. |
| 7,030,863 B2 | 4/2006 | Longe et al. |
| 7,036,128 B1 | 4/2006 | Julia et al. |
| 7,050,977 B1 | 5/2006 | Bennett |
| 7,062,428 B2 | 6/2006 | Hogenhout et al. |
| 7,069,560 B1 | 6/2006 | Cheyer et al. |
| 7,092,928 B1 | 8/2006 | Elad et al. |
| 7,096,432 B2 | 8/2006 | Huapaya et al. |
| 7,127,046 B1 | 10/2006 | Smith et al. |
| 7,136,710 B1 | 11/2006 | Hoffberg et al. |
| 7,137,076 B2 | 11/2006 | Iwema et al. |
| 7,137,126 B1 | 11/2006 | Coffman et al. |
| 7,139,714 B2 | 11/2006 | Bennett et al. |
| 7,147,562 B2 | 12/2006 | Ohara et al. |
| 7,177,798 B2 | 2/2007 | Hsu et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,904 B2 | 6/2007 | Luisi |
| 7,277,854 B2 | 10/2007 | Bennett et al. |
| 7,290,039 B1 | 10/2007 | Lisitsa et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,426,467 B2 | 9/2008 | Nashida et al. |
| 7,447,635 B1 | 11/2008 | Konopka et al. |
| 7,454,351 B2 | 11/2008 | Jeschke et al. |
| 7,475,010 B2 | 1/2009 | Chao |
| 7,483,894 B2 | 1/2009 | Cao |
| 7,502,738 B2 | 3/2009 | Kennewick et al. |
| 7,526,466 B2 | 4/2009 | Au |
| 7,539,656 B2 | 5/2009 | Fratkina et al. |
| 7,546,382 B2 | 6/2009 | Healey et al. |
| 7,548,895 B2 | 6/2009 | Pulsipher |
| 7,555,431 B2 | 6/2009 | Bennett |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,267 B2 | 4/2010 | Lisitsa et al. |
| 7,711,672 B2 | 5/2010 | Au |
| 7,716,056 B2 | 5/2010 | Weng et al. |
| 7,720,674 B2 | 5/2010 | Kaiser et al. |
| 7,725,307 B2 | 5/2010 | Bennett |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,752,152 B2 | 7/2010 | Paek et al. |
| 7,783,486 B2 | 8/2010 | Rosser et al. |
| 7,809,570 B2 | 10/2010 | Kennewick et al. |
| 7,818,176 B2 | 10/2010 | Freeman et al. |
| 7,822,608 B2 | 10/2010 | Cross, Jr. et al. |
| 7,831,426 B2 | 11/2010 | Bennett |
| 7,840,400 B2 | 11/2010 | Lavi et al. |
| 7,873,519 B2 | 1/2011 | Bennett |
| 7,873,654 B2 | 1/2011 | Bernard |
| 7,881,936 B2 | 2/2011 | Longé et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,930,168 B2 | 4/2011 | Weng et al. |
| 7,949,529 B2 | 5/2011 | Weider et al. |
| 7,974,844 B2 | 7/2011 | Sumita |
| 7,983,917 B2 | 7/2011 | Kennewick et al. |
| 7,983,997 B2 | 7/2011 | Allen et al. |
| 7,987,151 B2 | 7/2011 | Schott et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,041,570 B2 | 10/2011 | Mirkovic et al. |
| 8,055,708 B2 | 11/2011 | Chitsaz et al. |
| 8,069,046 B2 | 11/2011 | Kennewick et al. |
| 8,073,681 B2 | 12/2011 | Baldwin et al. |
| 8,082,153 B2 | 12/2011 | Coffman et al. |
| 8,095,364 B2 | 1/2012 | LongÉ et al. |
| 8,107,401 B2 | 1/2012 | John et al. |
| 8,112,275 B2 | 2/2012 | Kennewick et al. |
| 8,165,886 B1 | 4/2012 | Gagnon et al. |
| 2002/0167545 A1 | 11/2002 | Kang et al. |
| 2002/0168107 A1 | 11/2002 | Tang et al. |
| 2003/0160817 A1 | 8/2003 | Ishida et al. |
| 2003/0216913 A1 | 11/2003 | Keely |
| 2004/0140956 A1 * | 7/2004 | Kushler et al. ................ 345/168 |

| | | |
|---|---|---|
| 2004/0230912 A1 | 11/2004 | Clow et al. |
| 2005/0024341 A1 | 2/2005 | Gillespie et al. |
| 2005/0071332 A1 | 3/2005 | Ortega et al. |
| 2005/0080625 A1 | 4/2005 | Bennett et al. |
| 2005/0099408 A1* | 5/2005 | Seto et al. ............... 345/179 |
| 2005/0119897 A1 | 6/2005 | Bennett et al. |
| 2005/0152600 A1 | 7/2005 | Chen et al. |
| 2005/0174333 A1 | 8/2005 | Robinson et al. |
| 2006/0053387 A1 | 3/2006 | Ording |
| 2006/0085757 A1 | 4/2006 | Andre et al. |
| 2006/0117067 A1 | 6/2006 | Wright et al. |
| 2006/0122834 A1 | 6/2006 | Bennett |
| 2006/0143007 A1 | 6/2006 | Koh et al. |
| 2006/0144211 A1 | 7/2006 | Yoshimoto |
| 2006/0274051 A1 | 12/2006 | Longe et al. |
| 2007/0055529 A1 | 3/2007 | Kanevsky et al. |
| 2007/0088556 A1 | 4/2007 | Andrew |
| 2007/0100790 A1 | 5/2007 | Cheyer et al. |
| 2007/0120822 A1 | 5/2007 | Iso |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0030481 A1 | 2/2008 | Gunn et al. |
| 2008/0034032 A1 | 2/2008 | Healey et al. |
| 2008/0052063 A1 | 2/2008 | Bennett et al. |
| 2008/0094356 A1 | 4/2008 | Ording et al. |
| 2008/0120112 A1 | 5/2008 | Jordan et al. |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0300878 A1 | 12/2008 | Bennett |
| 2009/0006343 A1 | 1/2009 | Platt et al. |
| 2009/0030800 A1 | 1/2009 | Grois |
| 2009/0037837 A1* | 2/2009 | Raghunath et al. ........... 715/773 |
| 2009/0058823 A1 | 3/2009 | Kocienda |
| 2009/0076796 A1 | 3/2009 | Daraselia |
| 2009/0077464 A1 | 3/2009 | Goldsmith et al. |
| 2009/0100049 A1 | 4/2009 | Cao |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0226091 A1 | 9/2009 | Goldsmith et al. |
| 2009/0265669 A1 | 10/2009 | Kida et al. |
| 2009/0299745 A1 | 12/2009 | Kennewick et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0131036 A1 | 6/2011 | Dicristo et al. |
| 2011/0131045 A1 | 6/2011 | Cristo et al. |
| 2011/0144999 A1 | 6/2011 | Jang et al. |
| 2011/0161076 A1 | 6/2011 | Davis et al. |
| 2011/0175810 A1 | 7/2011 | Markovic et al. |
| 2011/0184730 A1 | 7/2011 | Lebeau et al. |
| 2011/0231182 A1 | 9/2011 | Weider et al. |
| 2011/0231188 A1 | 9/2011 | Kennewick et al. |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | Lebeau et al. |
| 2012/0022857 A1 | 1/2012 | Baldwin et al. |
| 2012/0022860 A1 | 1/2012 | Lloyd et al. |
| 2012/0022868 A1 | 1/2012 | Lebeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | Lebeau et al. |
| 2012/0023088 A1 | 1/2012 | Cheng et al. |
| 2012/0034904 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035931 A1 | 2/2012 | Lebeau et al. |
| 2012/0035932 A1 | 2/2012 | Jitkoff et al. |
| 2012/0042343 A1 | 2/2012 | Laligand et al. |

FOREIGN PATENT DOCUMENTS

| | | |
|---|---|---|
| EP | 1245023 (A1) | 10/2002 |
| EP | 1 698 982 | 9/2006 |
| JP | 06 019965 | 1/1994 |
| JP | 08-272787 | 10/1996 |
| JP | 10-049272 | 2/1998 |
| JP | 2000-112636 | 4/2000 |
| JP | 2001 125896 | 5/2001 |
| JP | 2002 024212 | 1/2002 |
| JP | 2002-108543 | 4/2002 |
| JP | 03-314276 | 8/2002 |
| JP | 2002-0325965 | 11/2002 |
| JP | 2003517158 (A) | 5/2003 |
| JP | 2005-092441 | 4/2005 |
| JP | 2009 036999 | 2/2009 |
| KR | 10-0776800 B1 | 11/2007 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10 2011 0113414 A | 10/2011 |
| WO | WO 00/74240 | 12/2000 |
| WO | WO 2005/064587 | 7/2005 |
| WO | WO 2007/037809 | 4/2007 |
| WO | WO 2007/047188 | 4/2007 |
| WO | WO 2007/070223 | 6/2007 |
| WO | WO 2009/032483 | 3/2009 |
| WO | WO 2009/111138 | 9/2009 |
| WO | WO 2011/088053 A2 | 7/2011 |

OTHER PUBLICATIONS

T. Masui, POBox: "An Efficient Text Input Method for Handheld and Ubiquitous Computers," Proceedings of the Internation Symposium on Handheld and Ubiquitous Computer (HUC '99), Sep. 1999, pp. 289-300.

C. Liu et al., "Online Recognition of Chinese Characters: The State-of-the-Art," IEEE Transactions on Pattern Analysis and Machine Intelligence, vol. 26, No. 2, Feb. 2004, pp. 198-213.

H. Sacher, "Interactions in Chinese: Designing Interfaces for Asian Languages," Interactions Magazine, vol. 5, Issue 5, Sep.-Oct. 1998, pp. 28-38.

Translated First Office Action dated Jul. 29, 2010, issued in Chinese Patent Application No. 200910118235.X, 9 pages.

International Search Report and Written Opinion, dated Apr. 29, 2009, issued in International Application No. PCT/US2009/033696.

International Search Report and Written Opinion, dated Feb. 18, 2009, issued in International Application No. PCT/US2009/072803.

Invitation to Pay Fees and Partial International Search Report, dated Nov. 11, 2008, issued in International Application No. PCT/US2009/072803.

Kida et al., "Language Input Interface on a Device", U.S. Appl. No. 12/107,711, filed Apr. 22, 2008.

Goldsmith et al., "Identification of Candidate Characters for Text Input", U.S. Appl. No. 12/167,044, filed Jul. 2, 2008.

Chou, "Zhuyin Input Interface on a Device", U.S. Appl. No. 12/476,121, filed Jun. 1, 2009.

Authorized officer Philippe Becamel, International Preliminary Report on Patentability in PCT/US2009/033696 mailed Sep. 16, 2010, 7 pages.

International Preliminary Report on Patentability in International Application No. PCT/US2009/072803 mailed Mar. 18, 2010.
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, in Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/nriultinnedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Elio, R. et al., "On Abstract Task Models and Conversation Policies," http://webdocs.cs.ualberta.ca/~ree/publications/papers2/ATS.AA99.pdf, 10 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Gruber, T. R., et al., "An Ontology for Engineering Mathematics," in Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Where the Social Web meets the Semantic Web," Presentation at the 5th International Semantic Web Conference, Nov. 7, 2006, 38 pages.
Gruber, T. R., "Despite our Best Efforts, Ontologies are not the Problem," AAAI Spring Symposium, Mar. 2008, http://tomgruber.org/writing/aaai-ss08.htm, 40 pages.
Gruber, T. R., "Enterprise Collaboration Management with Intraspect," Intraspect Software, Inc., Instraspect Technical White Paper Jul. 2001, 24 pages.
Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.
Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) in Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.
Gruber, T. R., et al.,"NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," in Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," in International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mühlhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http://www.technologyreview.com/printer_friendly_article.aspx?id=22117, 2 pages.

Neches, R., "Enabling Technology for Knowledge Sharing," Fall 1991, AI Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

Rice, J., et al., "Monthly Program: Nov. 14, 1995," The San Francisco Bay Area Chapter of ACM SIGCHI, http://www.baychi.org/calendar/19951114/, 2 pages.

Rice, J., et al., "Using the Web Instead of a Window System," Knowledge Systems Laboratory, Stanford University, http://tomgruber.org/writing/ksl-95-69.pdf, 14 pages.

Rivlin, Z., et al., "Maestro: Conductor of Multimedia Analysis Technologies," 1999 SRI International, Communications of the Association for Computing Machinery (CACM), 7 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Siri Smarter," Oct. 18, 2011, Technology Review, http:// www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakToIt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo, "Vlingo Launches Voice Enablement Application on Apple App Store," Vlingo press release dated Dec. 3, 2008, 2 pages.

YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.

YouTube, "Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.

YouTube, "Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.

YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.

International Search Report and Written Opinion dated Nov. 29, 2011, received in International Application No. PCT/US2011/20861, which corresponds to U.S. Appl. No. 12/987,982, 15 pages (Thomas Robert Gruber).

Glass, J., et al., "Multilingual Spoken-Language Understanding in the MIT Voyager System," Aug. 1995, http://groups.csail.mitedu/sis/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.

*Phoenix Solutions, Inc.* v. *West Interactive Corp.*, Document 40, Declaration of Christopher Schmandt Regarding the MIT Galaxy System dated Jul. 2, 2010, 162 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep..., 4 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, ©1994 IEEE, 9 pages.

\* cited by examiner

LANGUAGE INPUT INTERFACE ON A DEVICE

BACKGROUND

The subject matter of this specification is related generally to text input interfaces.

Traditional computer keyboards may be too large for portable devices, such as mobile phones, multimedia players, or personal digital assistants (PDAs). Some portable devices include a smaller version of the traditional computer keyboard or use a virtual keyboard to receive user input. A virtual keyboard can be of the form of a software application or a feature of a software application to simulate a computer keyboard. For example, in a portable device with a touch-sensitive display, a virtual keyboard can be used by a user to input text by selecting or tabbing areas of the touch-sensitive display corresponding to keys of the virtual keyboard.

These smaller keyboards and virtual keyboards may have keys that correspond to more than one character. For example, some of the keys can, by default, correspond to a character in the English language, for example, the letter "a," and may also correspond to other additional characters, such as another letter or the letter with an accent option, e.g., the character "ä," or other characters with accent options. Because of the physical limitations (e.g., size) of the virtual keyboard, a user may find it difficult to type characters not readily available on the virtual keyboard.

Input methods for devices having multi-language environments can present unique challenges with respect to input and spelling correction which may need to be tailored to the selected language to ensure accuracy and an efficient workflow.

SUMMARY

In general, one aspect of the subject matter described in this specification can be embodied in methods that include the actions of presenting a virtual keyboard in a first region of a touch sensitive display of a device, receiving an input representing a phonetic string on the virtual keyboard, presenting the entered phonetic string in a second region of the touch sensitive display, identifying one or more candidates based on the phonetic string, presenting at least a subset of the candidates in the first region or the second region, receiving an input selecting one of the candidates, and replacing the entered phonetic string with the selected candidate. Other embodiments of this aspect include corresponding systems, apparatus, computer program products, and computer readable media.

Particular embodiments of the subject matter described in this specification can be implemented to realize one or more of the following advantages. Text in languages that require phonetic string-to-character conversion can be input more efficiently on a portable device. Error correction and word prediction techniques can be applied to entry of East Asain languages.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Example Mobile Device

Figure 1:
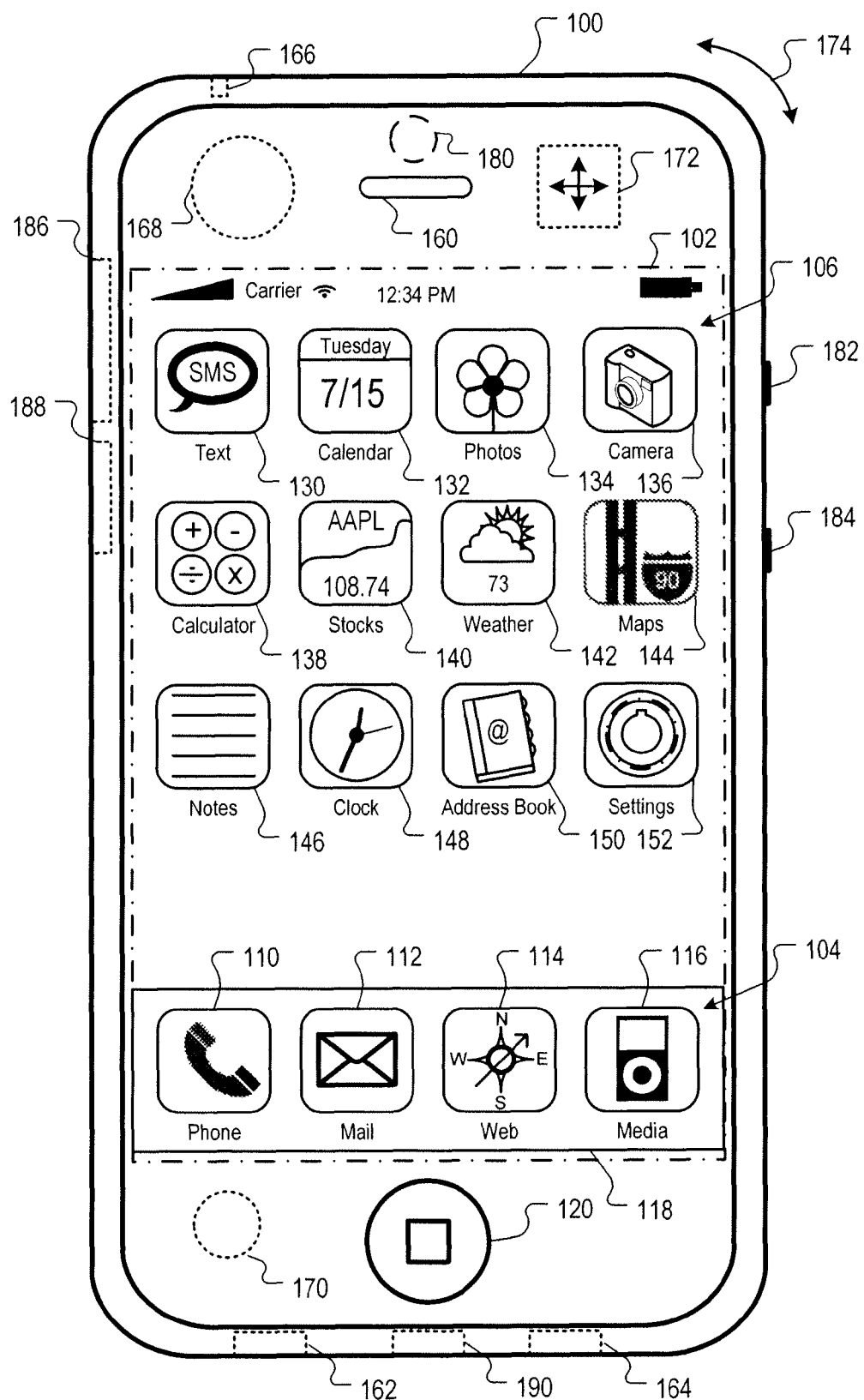
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1.

Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3 G), code division multiple access (CDMA), global system for mobile communications (GSM), Enhanced Data GSM Environment (EDGE), etc.

Example Mobile Device Architecture

Figure 2:
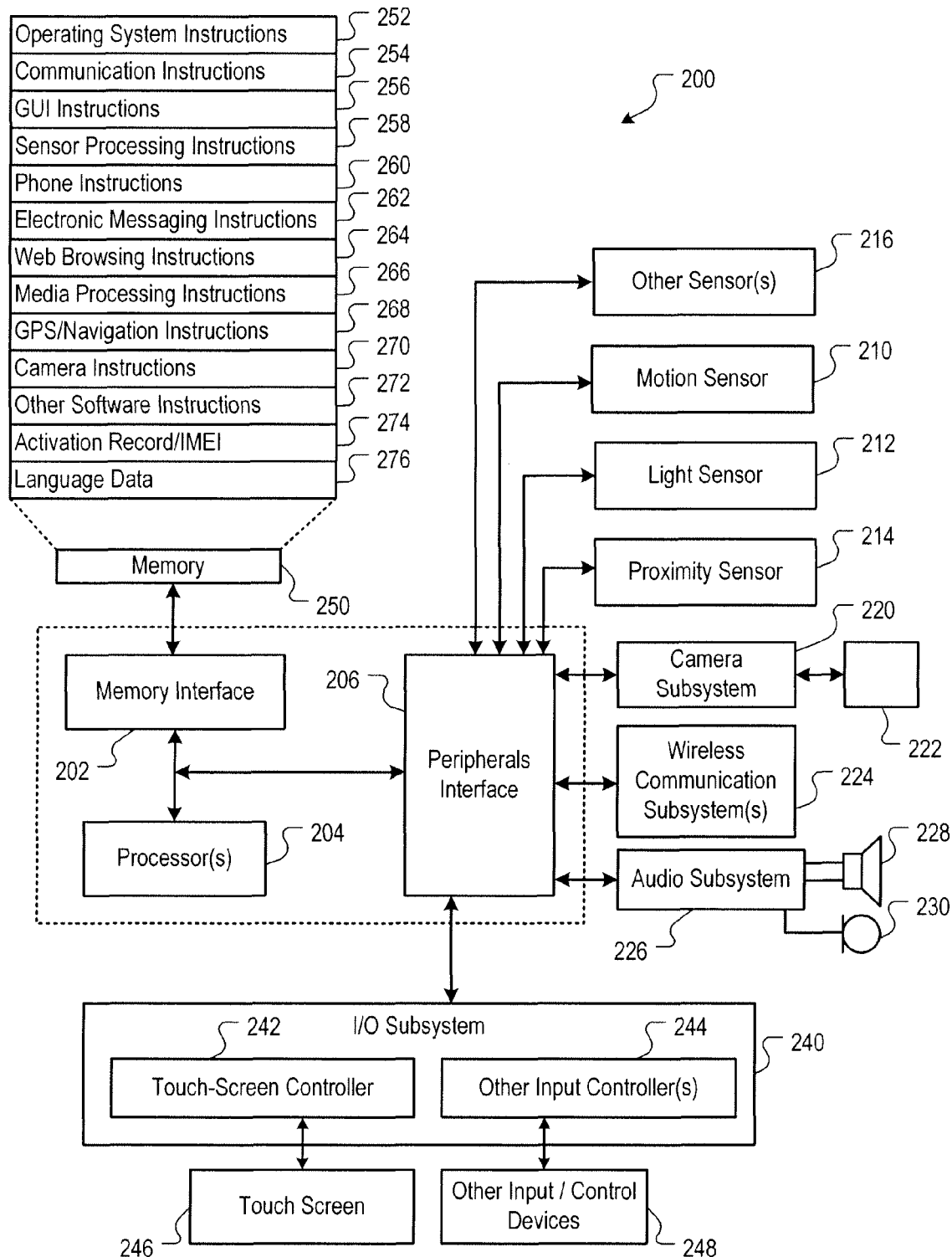
FIG. 2 is a block diagram of an example implementation of the mobile device of FIG. 1.

FIG. 2 is a block diagram 200 of an example implementation of the mobile device 100 of FIG. 1. The mobile device 100 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device 100 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions described with respect to FIG. 1. Other sensors 216 can also be connected to the peripherals interface 206, such as a positioning system (e.g., GPS receiver), a temperature sensor, a biometric sensor, or other sensing device, to facilitate related functionalities.

A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device 100 is intended to operate. For example, a mobile device 100 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 100 may be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230.

In one implementation, a pressing of the button for a first duration may disengage a lock of the touch screen 246; and a pressing of the button for a second duration that is longer than the first duration may turn power to the mobile device 100 on or off. The user may be able to customize a functionality of one or more of the buttons. The touch screen 246 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 30-pin connector that is compatible with the iPod™. Other input/output and control devices can also be used.

The memory interface 202 can be coupled to memory 250. The memory 250 can include high-speed random access memory and/or non-volatile memory, such as one or more magnetic disk storage devices, one or more optical storage devices, and/or flash memory (e.g., NAND, NOR). The memory 250 can store an operating system 252, such as Darwin, RTXC, LINUX, UNIX, OS X, WINDOWS, or an embedded operating system such as VxWorks. The operating system 252 may include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions, e.g., security processes and functions. The memory 250 may also store other software instructions (not shown), such as web video instructions to facilitate web video-related processes and functions; and/or web shopping instructions to facilitate web shopping-related processes and functions. In some implementations, the media processing instructions 266 are divided into audio processing instructions and video processing instructions to facilitate audio processing-related processes and functions and video processing-related processes and functions, respectively. An activation record and International Mobile Equipment Identity (IMEI) 274 or similar hardware identifier can also be stored in memory 250.

Language data 276 can also be stored in memory 250. Language data 276 can include, for example, word dictionaries (i.e., list of possible words in a language) for one or more languages, dictionaries of characters and corresponding phonetics, one or more corpuses of characters and character compounds, and so on.

Each of the above identified instructions and applications can correspond to a set of instructions for performing one or more functions described above. These instructions need not be implemented as separate software programs, procedures, or modules. The memory 250 can include additional instructions or fewer instructions. Furthermore, various functions of the mobile device 100 may be implemented in hardware and/or in software, including in one or more signal processing and/or application specific integrated circuits.

Language Input Interface

FIGS. 3A-3F illustrate an example user interface for entering multi-lingual text on mobile device 100. Mobile device 100 can display a text input area 302 and a virtual keyboard 304 on the touch-sensitive display 102. The text input area 302 can be any area where input text can be displayed, e.g., a note-taking application, an email application, and so on. In some implementations, the text input area 302 can be one or more text fields located in a document (e.g., a web page rendered in a web browser application). The virtual keyboard 304 includes one or more virtual keys 303 that each correspond to a letter in an alphabet (e.g., Latin alphabet). The virtual keyboard 304 can include a keyboard toggle key 308 for toggling between letter keys and keys for numbers, punctuation, etc. (i.e., either letter keys or numbers/punctuation keys can be displayed in the virtual keyboard 304). A user can enter text by touching the touch-sensitive display 102 on the areas of the desired keys of the virtual keyboard 304; the user selects or hits the desired keys of the virtual keyboard 304. Letters, numbers, etc. corresponding to the touched keys are displayed in the text input area 302 as unconverted current input 310-A. The user can hit the backspace key 306 to delete the last input character.

In some implementations, the mobile device 100 includes capability to input text in a non-English language using Latin alphabet virtual keyboard. For example, the mobile device 100 can include capability for inputting Chinese and/or Japanese text, including Chinese or Japanese characters and symbols, using a Latin alphabet virtual keyboard (e.g., virtual keyboard with letters arranged in a QWERTY layout). For example, the device 100 can include a Chinese or Japanese text entry mode that utilizes a Latin alphabet keyboard. A user can use the virtual keyboard to enter a phonetic string of letters representing sounds or syllables in the non-English language. For example, a user can user the virtual keyboard to type in a romanization of one or more characters or symbols in Chinese or Japanese.

For convenience, the implementations in this specification will be described in reference to entry of Japanese language text. It should be appreciated, however, that the described implementations can be applied to other non-English languages (e.g., Chinese). More generally, the described implementations can be applied to any text input interface that involves identification, presentation, and selection of candidates for inputs, regardless of language (e.g., Latin alphabet romanization to non-Latin-alphabet text, spelling and grammar correction, thesaurus features, etc.).

Figure 3A:
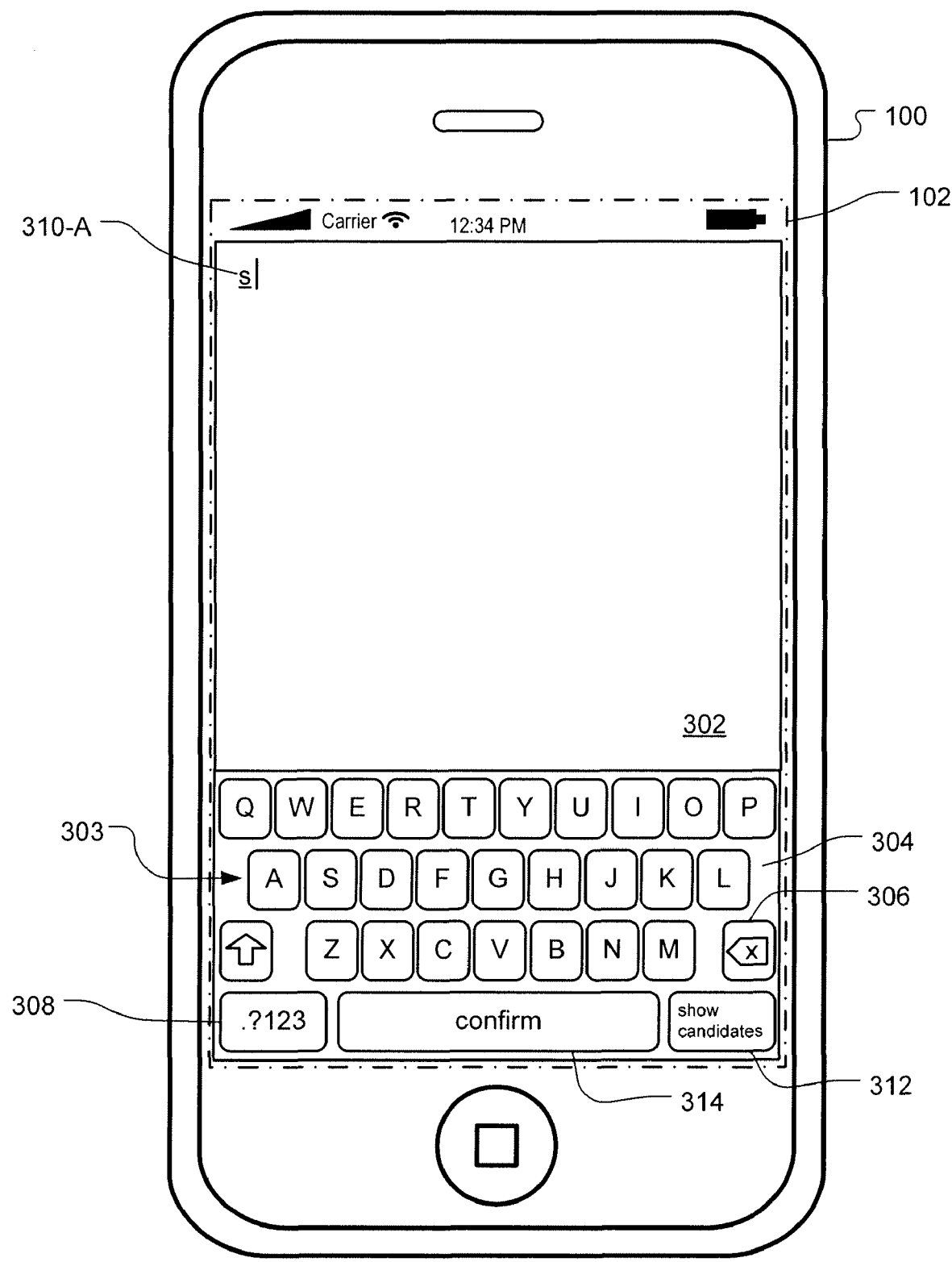
FIGS. 3A-3F illustrate an example user interface for entering text.

When a user inputs in a first letter of a phonetic string, the letter is displayed in the text input area 302 as an unconverted current input 310-A, as shown in FIG. 3A. In some implementations, the input 310-A is displayed with underlining or some other formatting (e.g., bold text, italics, highlighting). The underlining/formatting indicates that the input is a provisional input subject to conversion pending additional input from the user, whether that additional input is additional letters or a selection of a candidate by the user. For example, in FIG. 3A, the user hits the "s" key, and the letter "s" is displayed in the text input area 302 as current input 310-A with underlining.

The virtual keyboard 304 can include a "confirm" key 314 that, when hit by the user, accepts the displayed input 310-A as is. The accepted input is displayed without the underlining. For example, in FIG. 3A, the user can hit the "confirm" key 314 to accept the input string "s" as is; "s" is displayed without underlining. In some implementations, hitting of the "confirm" key 214 also adds a space after the accepted input. In some other implementations, the addition of the space after the accepted input depends on whether the accepted input is in a language where spaces separate words and/or whether the accepted input is the end of a sentence, to name a few example criteria. In some implementations, key 314 is a "space" key that, when pressed, accepts the current input as is, effectively serving as a "confirm" key.

The virtual keyboard 304 can also include a "show candidates" key 312. By hitting the "show candidates" key 312, the user can bring up a tray of candidate characters, symbols, and combinations thereof (e.g., kanji, kana combinations) with which to replace the input 310-A. The tray of candidates is further described below.

Figure 3B:
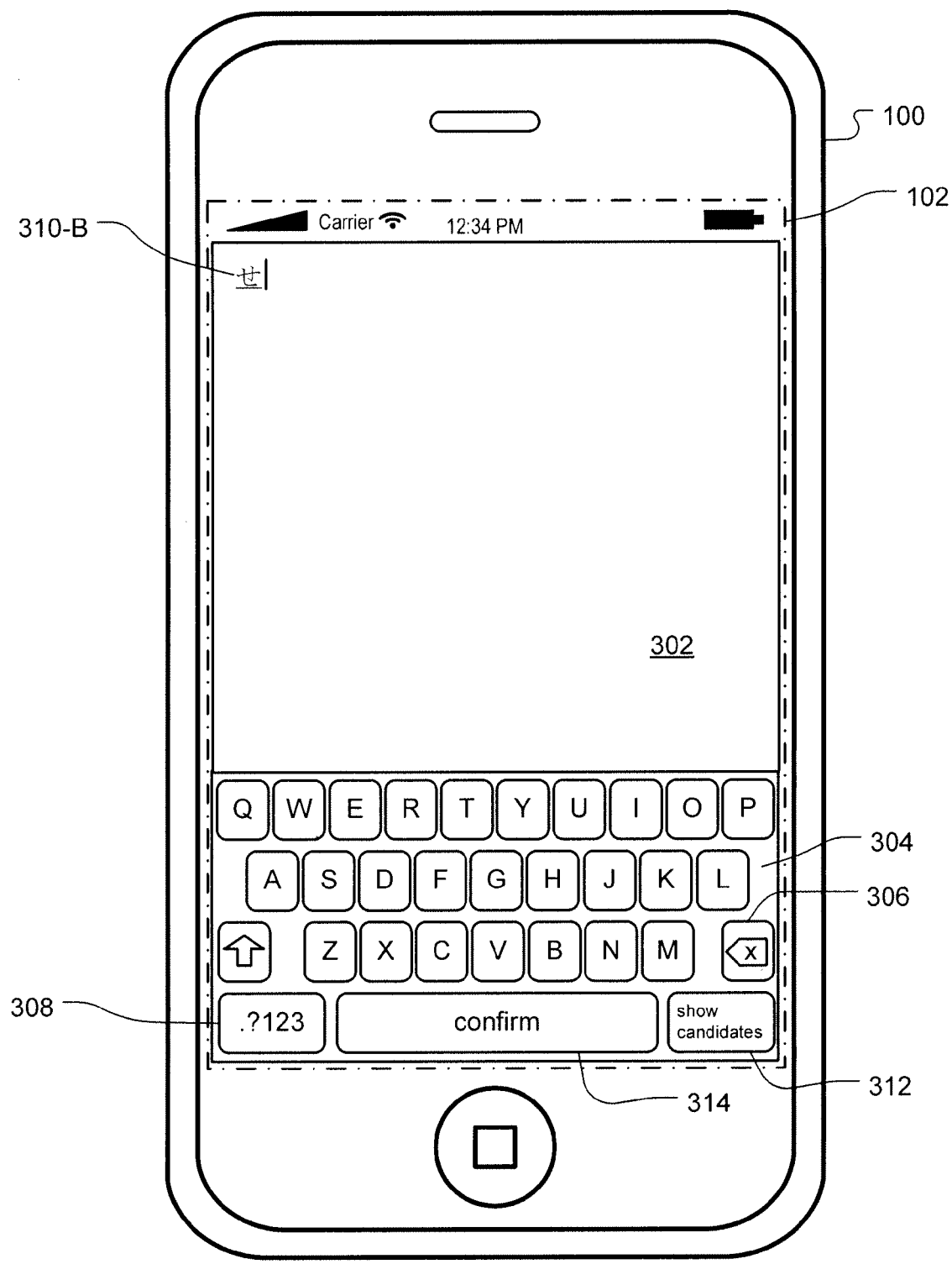

Continuing from the example input 310-A shown in FIG. 3A, the user next hits the letter "e" on the keyboard, resulting in the string "se." The string "se" can be converted by the device 100 to the hiragana symbol "せ",of which the string "se" is the romanization, and the hiragana symbol "せ",is displayed as converted current input 310-B with underlining, as shown in FIG. 3B. The user can hit the "confirm" key 314 to accept the hiragana symbol "せ",as is; "せ",is then displayed without underlining. Alternatively, the user can hit the "show candidates" key 312 to bring up the tray of candidates related to the string "se" (e.g., characters whose phonetic readings begin with "se").

Figure 3C:
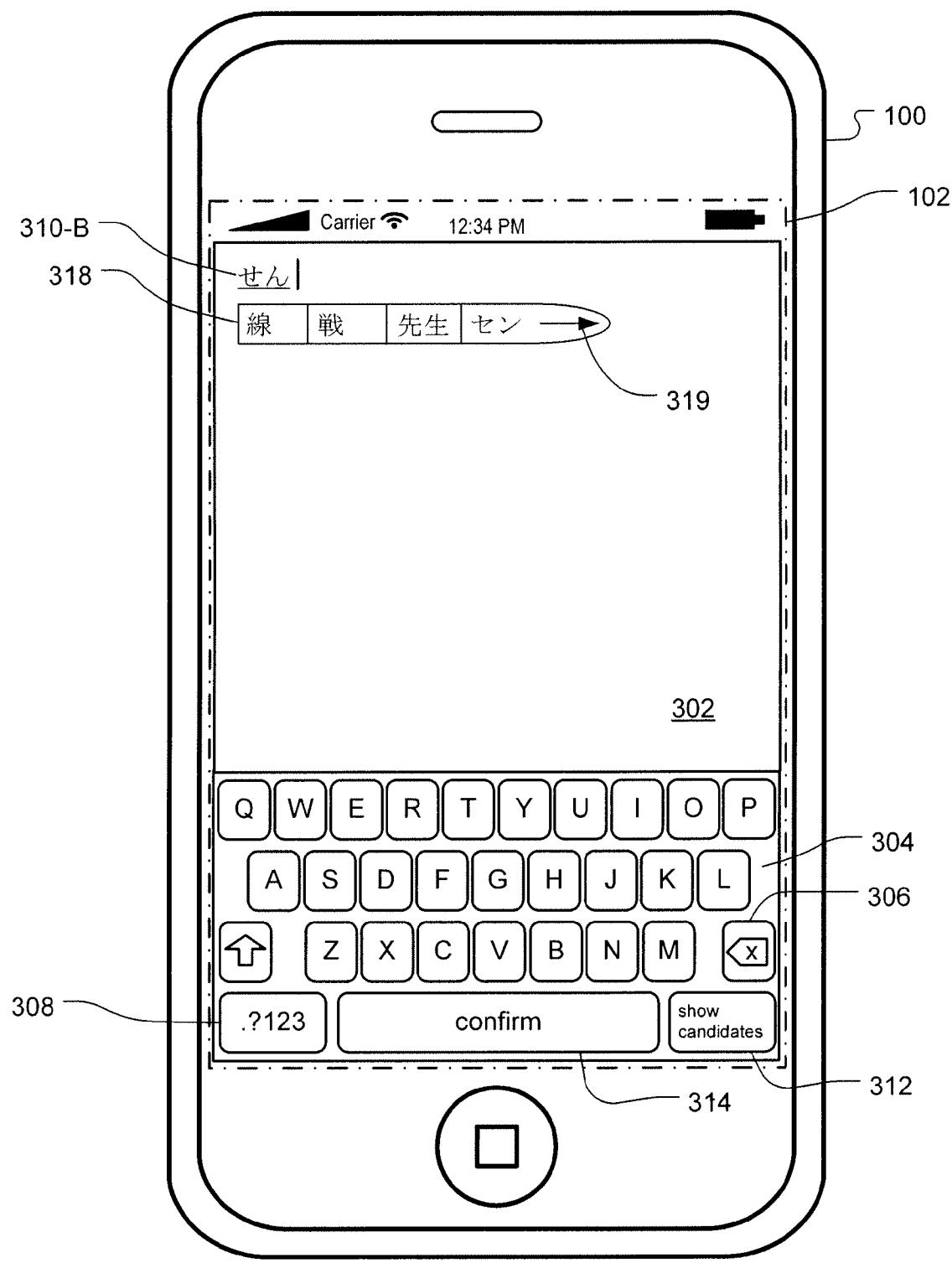

Continuing from the example input 310-B as shown in FIG. 3B, the user next hits the "n" key, resulting in the string "sen." The terminal "n" letter is converted to the hiragana symbol "ん",of which the terminal "n" is the romanization, and appended to the already-converted hiragana symbol "せ",The hiragana symbol "せん"is displayed as converted current input 310-B with underlining, as shown in FIG. 3C.

In some implementations, the device 102 can display one or more suggested candidates 318 inline for the input 310-B. The suggested candidates can include single characters, phonetic symbols (e.g., Japanese kana), and combinations of multiple characters and/or phonetic symbols. For example, in FIG. 3C, the kanji character "線"is displayed as a suggested candidate for "せん" "せん"("sen") is the onyomi reading for the kanji character "線"In some implementations, the user can hit a suggested candidate (i.e., touch the touch-sensitive display 102 over the area of the desired suggested candidate) to select a suggested candidate, continue typing letter keys on the virtual keyboard 304 to add to the input 310-B, or hit the "show candidates" key 312 to bring up the candidates tray, among other actions. If the user selects a suggested candidate, the selected suggested candidate is displayed as accepted input 336, as shown in FIG. 3F. If the user continues typing on the letter keys on the virtual keyboard 304, the current input 310-B is extended and possible candidates for the current input 310-B are narrowed down.

In some implementations, the one or more suggested candidates 318 that are presented to the user are determined by the device 100 to be the best match for the input 310-B based on one or more criteria (e.g., frequency in the language, exact match, etc.).

In some implementations, more candidates can be displayed by the device 100 when the user hits an arrow graphical object 319 or the like on the touch-sensitive display 102. For example, when the user hits the arrow 319, a candidates tray 322 can be displayed. Alternatively, the inline suggested candidates list 318 can expand to show more candidates. The arrow 319 gives the user a hint that there are additional candidates available.

In some implementations, the user can hit the confirm key 314 once to select the first candidate of the suggested candidates 318, hit the confirm key 314 twice in quick succession to select the second candidate of the suggested candidates 318, and so on.

Figure 3D:
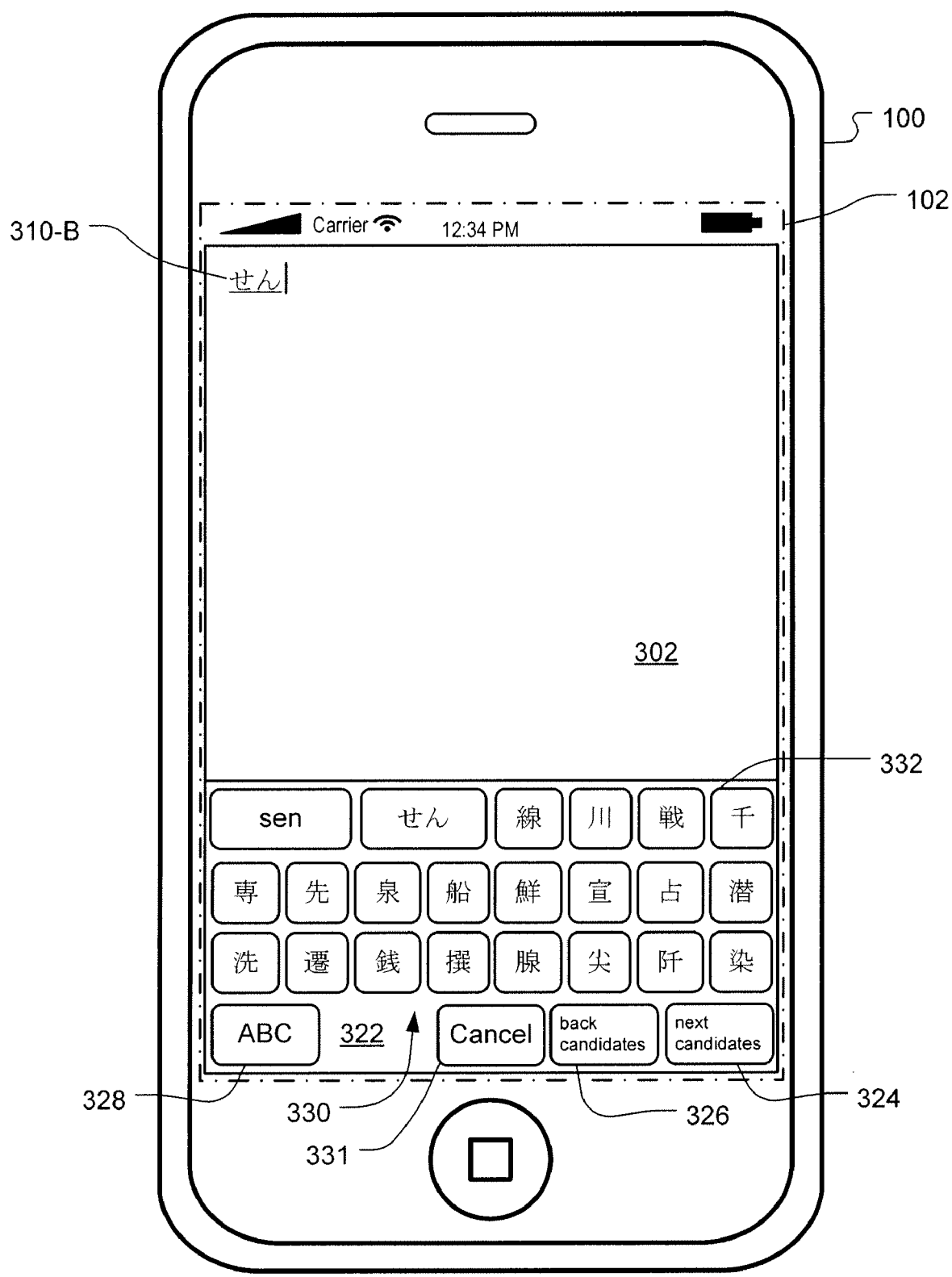

If the user hits the "show candidates" key 312 or the arrow 319, a candidates tray 322 can be displayed, as shown in FIG. 3D. In some implementations, the candidates tray 322 is displayed in place of the virtual keyboard 304. In some other implementations, the candidates tray 322 is displayed over all or part of the text input area 302. In some implementations, the candidates tray 322 slides over the virtual keyboard 304 or the text input area 302, and the sliding is displayed as an animated effect. When the candidates tray 322 is removed from view, the candidates tray 322 can slide off the touch-sensitive display 102.

The candidates tray 322 can include one or more candidate keys 330, each of the candidate keys 330 corresponding to a candidate for conversion of the input 310-B. A candidate (whether for the candidate keys 330 or suggested candidates 318) can be a character, a phonetic or syllabic symbol (e.g., a kana symbol), romanization, multi-character combinations forming words or phrases, multi-symbol combinations forming words or phrases, a combination of characters and symbols forming words or phrases, and so on. The candidates can include characters whose phonetic reading is or begins with the input 310-B as a reading, words that begin with the input 310-B, and so on. For example, in FIG. 3D, the candidates tray 322 includes some candidate keys 330 that correspond to kanji characters that has "せん" as a reading. In some implementations, the candidates in the candidates tray are ordered based on various criteria as to which candidate is the best candidate.

In some implementations, the candidates for the suggested candidates 318 and the candidates tray 322 are identified and ordered using predictive text and/or error correction techniques, examples of which include fuzzy matching, techniques for determining cursor position based on a finger contact, and so on. An example of a predictive text technique is disclosed in Masui, "An Efficient Text Input Method for Pen-based Computers," in *Proceedings of the ACM Conference on Human Factors in Computing Systems* (CHI '98), Addison-Wesley, April 1998, pp. 328-335, the disclosure of which is incorporated by reference herein in its entirety. An example of a techniques for determining cursor position based on a finger contact is disclosed in U.S. patent application Ser. No. 11/850,015, titled "Methods for Determining a Cursor Position from a Finger Contact with a Touch Screen Display," filed Sep. 4, 2007, the disclosure of which is incorporated by reference herein in its entirety.

In some implementations, if the candidates tray 322 is displayed over the virtual keyboard 304, the candidates tray 322 can also include a keyboard switch key 328 for switching back to the virtual keyboard 304. The candidates tray 322 can also include back candidates key 326 and/or next candidates key 324 for moving back and forth between sets of candidate keys 330 within the candidates tray 322. In some implementations, the candidates tray 322 also includes the confirm key 314.

Figure 3E:
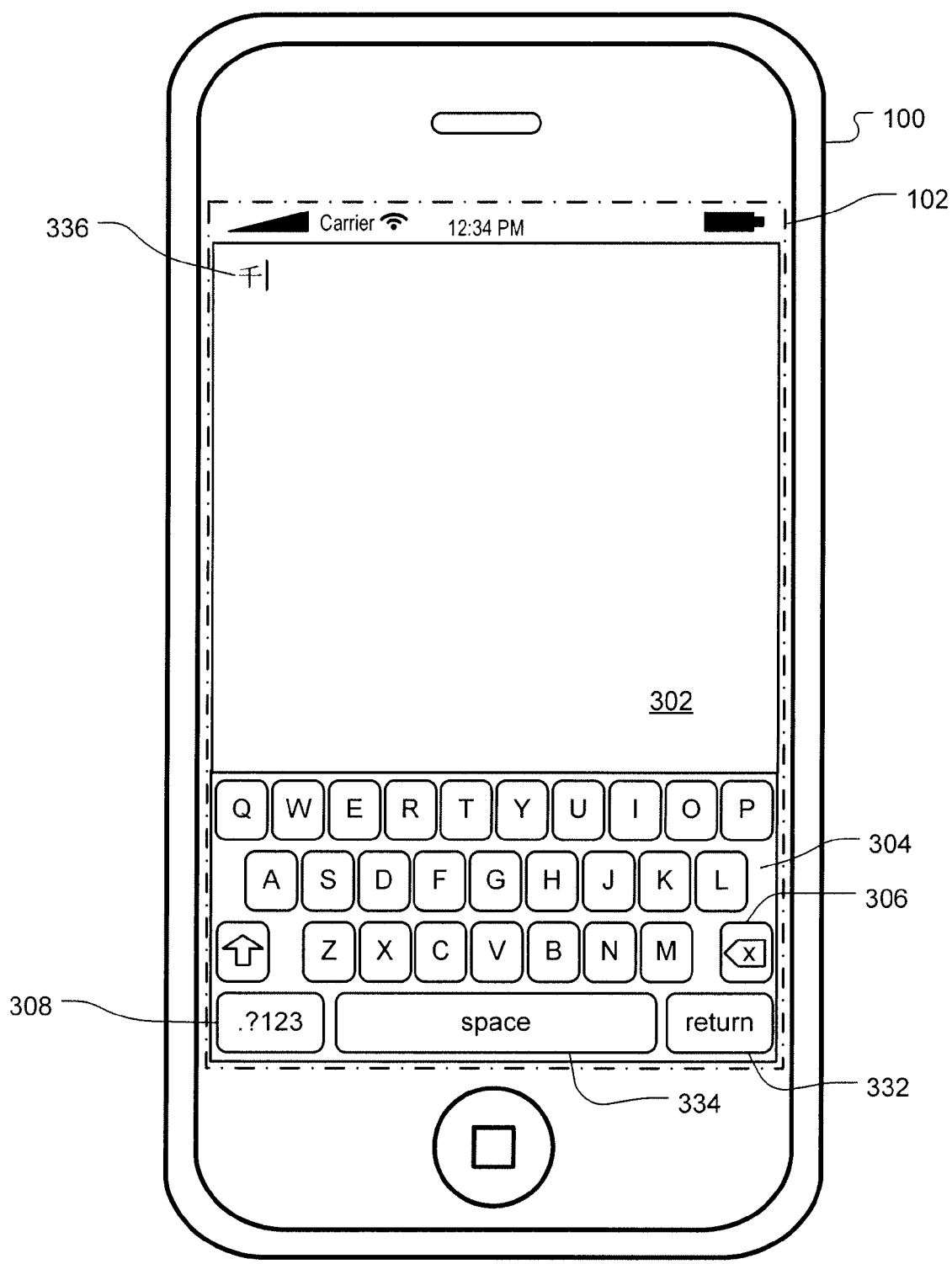
Figure 3F:
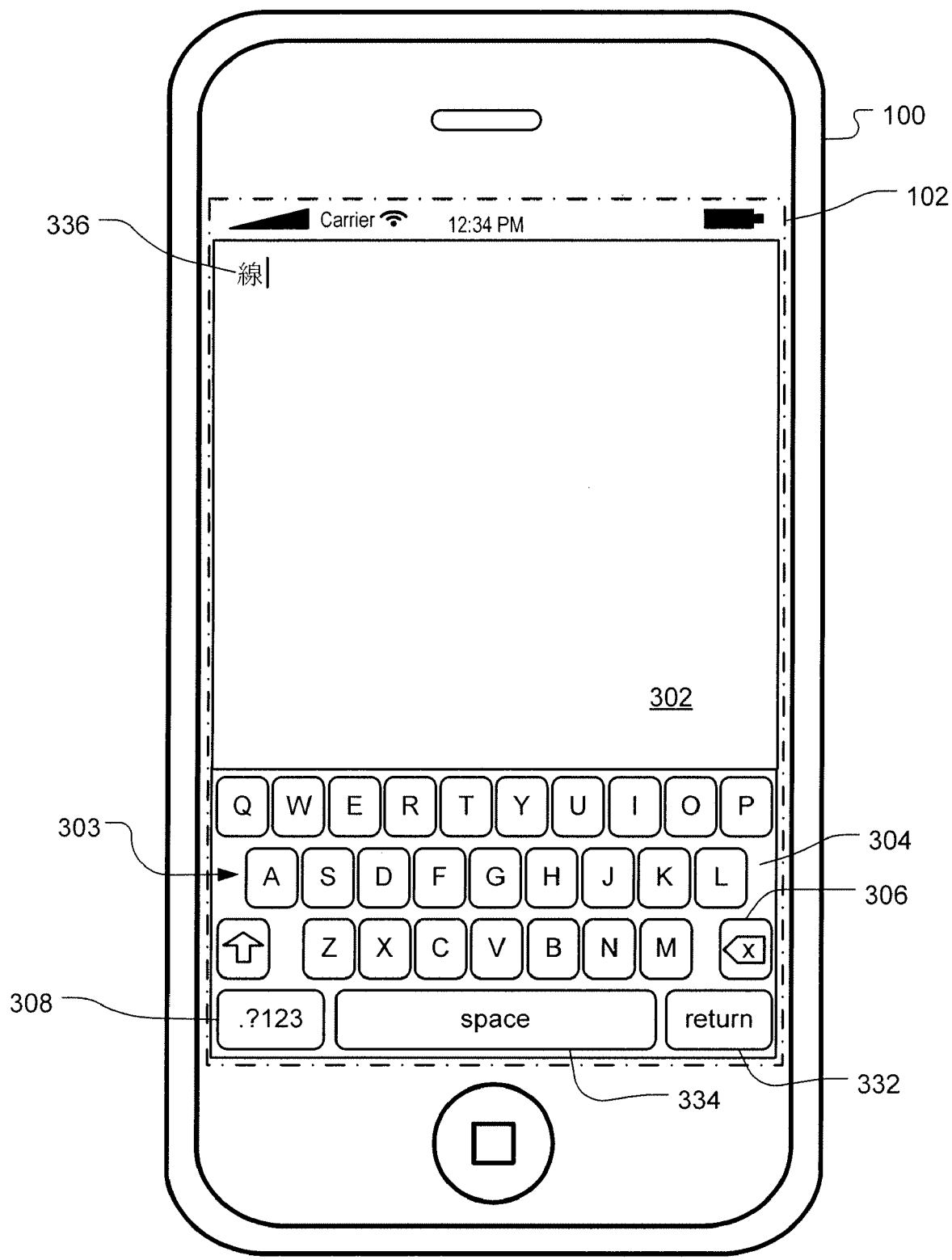

The user can hit a candidate key 330 to replace the input 310-B with the candidate corresponding to the hit candidate key 330. For example, from FIG. 3D, if the user hits the key that corresponds to the candidate character "千"(key 332), the input 310-B is replaced with the character "千" The character "千"is displayed as accepted input 336, as shown in FIG. 3E. In FIG. 3E, the candidates tray 322 reverts back to virtual keyboard 304. The virtual keyboard 304 can include a "space" key 334 and a "return" key 332 in place of "confirm" key 314 and show candidate key 312, respectively. From FIG. 3F, the user can enter a new phonetic string input.

In some implementations, the virtual keyboard 304 can include a key for switching between multiple input keyboards for various languages.

In some implementations, the candidates tray 322 includes a cancel key 331 for reverting back to the virtual keyboard 304 from the candidates tray 322 without selecting a candidate.

In some implementations, a candidate in the suggested candidates 318 or candidates tray 322 is highlighted as the "currently selected" candidate. When the suggested candidates 318 or candidates tray 322 is first displayed after an input of a phonetic string, the initial highlighted candidate can be the phonetic string itself in the suggested candidates 318 or candidates tray 322 or the "best" candidate. Key 312 can be a "next candidate" key, where a press of the key moves the highlighting to the next candidate. In some implementations, there can be a "previous candidate" key to move the highlighting backward to a previous candidate. The confirm key 314 can be used to accept the highlighted candidate.

In some other implementations, when the user inputs a phonetic sting, no candidate is automatically selected or highlighted by default; the user can hit the confirm key 314 to accept the phonetic string as is. The user can hit the next candidate key (and optionally a previous candidate key) to move through the candidates and highlight one of them. As different candidates are highlighted, the current input 310-B changes to show the currently highlighted candidate, while still displayed with underlining or other formatting to indicate that the current input 310-B is still provisional. Hitting a return key (e.g., return key 332) confirms the currently selected candidate or the phonetic string (i.e., whatever phonetic string or candidate is shown in the current input 310-B). Adding more phonetic symbols by typing on the virtual keyboard 304 also automatically accepts the currently selected candidate or the phonetic string (i.e., whatever phonetic string or candidate is shown in the current input 310-B).

Figure 4:
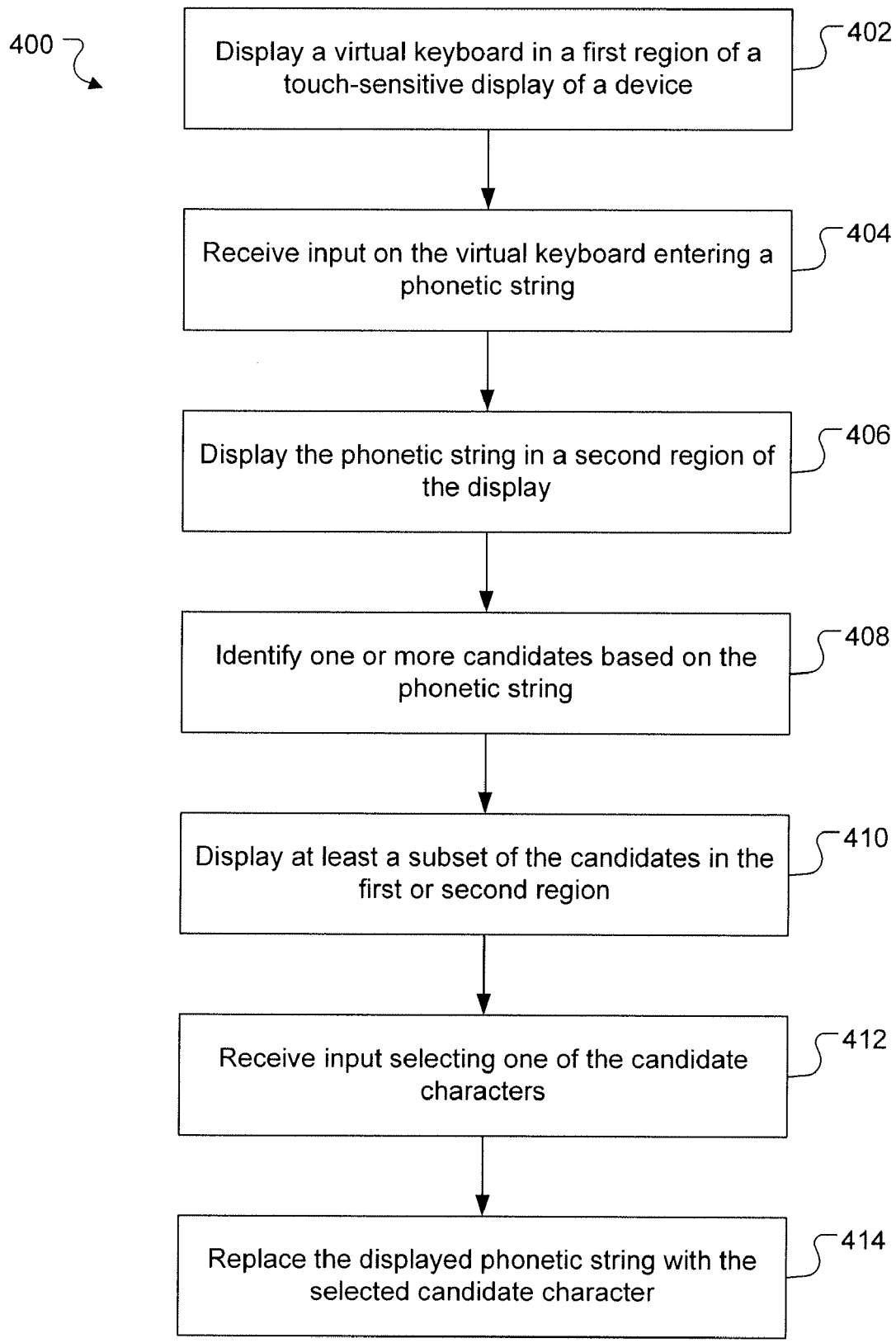
FIG. 4 illustrates an example text input process.
Like reference numbers and designations in the various drawings indicate like elements.

FIG. 4 illustrates an example text input process 400. For convenience, the process 400 will be described in reference to a device (e.g., device 100) that performs the process 400.

A virtual keyboard is displayed in a first region of a touch-sensitive display of a device (402). For example, the device displays virtual keyboard 304 on a portion of the touch-sensitive display 102.

An input is received entering a phonetic string on the virtual keyboard (404). A user can enter one or more letters using the virtual keyboard. The entered letters can constitute a phonetic string. The phonetic string can be a romanization of characters, words, and the like in a language that does not use the Latin alphabet, for example.

The input phonetic string is displayed in a second region of the display (406). The device 100 can display the phonetic string in a text input area on the touch-sensitive Display 102. In some implementations, the device 100 converts the phonetic string to, for example, symbols corresponding to the phonetic string (e.g., Japanese kana, Chinese zhuyin, etc.).

One or more candidates matching the phonetic string are identified (408). For example, the device 100 can look up the phonetic string in a dictionary, character database, or the like, and finds matching characters for the phonetic string. In some implementations, the device 100 can segment the phonetic string based on syllables or another criteria and find candidates for each of the segments.

At least a subset of the identified candidates is displayed in the first region of the touch sensitive display (410). For example, the candidates can be displayed in a candidates tray 322 that is displayed in place of the virtual keyboard 304. In some implementations, if there are more candidates than can fit in the tray 322, the user can navigates to the overflow candidates by hitting the back candidates 326 or next candidates key 324.

Input is received selecting one of the candidates (412). For example, a user can hit one of the candidate keys 330 in a candidates tray 322 to select the corresponding candidate.

The displayed phonetic string is replaced with the selected candidate (414). In some implementations, the selected candidate is displayed on the touch-sensitive display in place of the input phonetic string.

In some implementations, the virtual keyboard 304 and the candidates tray 322 can be dynamically resized based on the orientation of the touch-sensitive display 102. For example, FIGS. 3A-3F show the virtual keyboard 304 or the candidates tray 322 in portrait orientation. If the device 100, and thus the touch-sensitive display 102, is rotated to landscape orientation, the device 100 can detect the rotation and resize the keyboard 304 and the candidates tray 322 to fit the landscape width of the touch-sensitive display 102.

In some implementations, the suggested candidates 318 are displayed in the same orientation as the text input, whose orientation can vary by language. For example, if the text is displayed from left-to-right, the suggested candidates 318 are displayed from left to right. If the text is displayed from right to left, the suggested candidates 318 are displayed from right to left. If the text displayed from top to bottom, the suggested candidates 318 are displayed from top to bottom.

In some implementations, the phonetic string can be input by voice rather than typing on the virtual keyboard 304. For example, the device 100 can include a voice recognition module that receives and processes a user's voice input and generates a phonetic string based on the voice input. The device 100 can identify candidates for the phonetic string generated by the voice recognition module for selection by the user.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   presenting a virtual keyboard corresponding to a first alphabet in a first region of a touch-sensitive display of a device;
   receiving an input on the virtual keyboard representing a phonetic string;
   presenting the phonetic string in a second region of the touch-sensitive display;
   identifying one or more candidate representations based on the phonetic string, wherein the candidate representations correspond to a second alphabet different from the first alphabet;
   presenting a candidate tray including at least a subset of the candidate representations;
   receiving an input of a selected candidate representation of the candidate representations; and
   replacing the entered phonetic string with the selected candidate representation.

2. The method of claim 1, wherein:
   the phonetic string comprises Chinese romanization; and
   the candidates comprise Chinese characters.

3. The method of claim 1, wherein:
   the phonetic string comprises Japanese romanization; and
   the candidates comprise one or more of the group consisting of Japanese kanji characters and Japanese kana symbols.

4. The method of claim 1, wherein the virtual keyboard comprises keys corresponding to letters of the Latin alphabet.

5. The method of claim 1, wherein the candidates comprise multi-character words.

6. The method of claim 1, wherein identifying one or more candidates based on the phonetic string comprises identifying one or more candidates using text prediction from the phonetic string.

7. The method of claim 6, wherein presenting at least a subset of the candidates comprises presenting the subset of the candidates in an order determined based on the text prediction.

8. A portable device comprising:
   a touch-sensitive display;
   memory;
   one or more processors; and
   instructions stored in the memory and configured for execution by the one or more processors, the instructions comprising instructions to:
   present a virtual keyboard corresponding to a first alphabet in a first region of the touch-sensitive display of a device;
   receive an input on the virtual keyboard representing a phonetic string;
   present the phonetic string in a second region of the touch-sensitive display;
   identify one or more candidaterepresentations based on the phonetic string, wherein the candidate representations correspond to a second alphabet different from the first alphabet;
   present a candidate tray including at least a subset of the candidate representations in the first region;
   receive an input of a selected candidate representation selecting one of the candidate representations; and
   replace the entered phonetic string with the selected candidate representation.

9. The device of claim 8, wherein:
   the phonetic string comprises Chinese romanization; and
   the candidates comprise Chinese characters.

10. The device of claim 8, wherein:
    the phonetic string comprises Japanese romanization; and
    the candidates comprise one or more of the group consisting of Japanese kanji characters and Japanese kana symbols.

11. The device of claim 8, wherein the virtual keyboard comprises keys corresponding to letters of the Latin alphabet.

12. The device of claim 8, wherein the candidates comprise multi-character words.

13. The device of claim 8, further comprising instructions to identify one or more candidates using text prediction from the phonetic string.

14. The device of claim 13, further comprising instructions to present the subset of the candidates in an order determined based on the text prediction.

15. A computer program product, encoded on a tangible program carrier, operable to cause a portable device to perform operations comprising:
    presenting a virtual keyboard corresponding to a first alphabet in a first region of a touch-sensitive display of a device;
    receiving an input on the virtual keyboard representing a phonetic string;
    presenting the phonetic string in a second region of the touch-sensitive display;
    identifying one or more candidate representations based on the phonetic strings wherein the candidate representations correspond to a second alphabet different from the first alphabet;
    presenting a candidate tray including at least a subset of the candidate representations in the first region;
    receiving an input of a selected candidate representation of the candidate representations; and
    replacing the entered phonetic string with the selected candidate representation.

16. The program product of claim 15, wherein:
    the phonetic string comprises Chinese romanization; and
    the candidates comprise Chinese characters.

17. The program product of claim 15, wherein:
the phonetic string comprises Japanese romanization; and
the candidates comprise one or more of the group consisting of Japanese kanji characters and Japanese kana symbols.

18. The program product of claim 15, wherein the virtual keyboard comprises keys corresponding to letters of the Latin alphabet.

19. The program product of claim 15, wherein the candidates comprise multi-character words.

20. The program product of claim 15, wherein identifying one or more candidates based on the phonetic string comprises identifying one or more candidates using text prediction from the phonetic string.

21. The program product of claim 20, wherein presenting at least a subset of the candidates comprises presenting the subset of the candidates in an order determined based on the text prediction.

22. A method comprising:
presenting a virtual keyboard corresponding to a first alphabet in a first region of a touch-sensitive display of a device;
receiving an input on the virtual keyboard representing a phonetic string;
presenting the phonetic string in a second region of the touch-sensitive display;
identifying one or more candidate representations based on the phonetic string, wherein the candidate representations correspond to a second alphabet different from the first alphabet;
presenting at least a subset of the candidate representations inline with the phonetic string in the second region, where the candidate representations are displayed according to an orientation of text in the second region;
receiving an input selecting one of the candidate representations; and
replacing the entered phonetic string with the selected candidate representation.

23. The method of claim 1, further comprising identifying one or more additional candidate representations based on the phonetic string in a third alphabet different from the first and second alphabets, wherein the candidate tray includes at least a subset of the additional candidate representations.

24. The method of claim 1, wherein the candidate tray further includes the phonetic string.

25. The method of claim 1, wherein the second alphabet comprises logographic characters.

26. The method of claim 1, wherein the candidate tray is presented in place of the virtual keyboard.

27. The method of claim 8, wherein the candidate tray is presented in place of the virtual keyboard.

28. The method of claim 15, wherein the candidate tray is presented in place of the virtual keyboard.

* * * * *

UNITED STATES PATENT AND TRADEMARK OFFICE
CERTIFICATE OF CORRECTION

| | | |
|---|---|---|
| PATENT NO. | : 8,289,283 B2 | Page 1 of 1 |
| APPLICATION NO. | : 12/042309 | |
| DATED | : October 16, 2012 | |
| INVENTOR(S) | : Kida et al. | |

It is certified that error appears in the above-identified patent and that said Letters Patent is hereby corrected as shown below:

In column 14, line 15, please delete "candidaterepresentations" and add -- candidate representations --;

In column 14, line 20, please delete "in the first region";

In column 14, line 22, please delete "selecting one";

In column 14, line 58, please delete "in the first region";

In column 16, line 9, please delete "candidaterepresentations" and add -- candidate representations --.

Signed and Sealed this
Fourth Day of December, 2012

David J. Kappos
*Director of the United States Patent and Trademark Office*

(12) EX PARTE REEXAMINATION CERTIFICATE (10441st)
United States Patent
Kida et al.

(10) Number: US 8,289,283 C1
(45) Certificate Issued: Dec. 17, 2014

(54) LANGUAGE INPUT INTERFACE ON A DEVICE

(75) Inventors: Yasuo Kida, Palo Alto, CA (US); Ken Kocienda, Sunnyvale, CA (US); Elizabeth Caroline Furches, San Francisco, CA (US)

(73) Assignee: Apple Inc., Cupertino, CA (US)

Reexamination Request:
No. 90/012,764, Jan. 11, 2013

Reexamination Certificate for:
Patent No.: 8,289,283
Issued: Oct. 16, 2012
Appl. No.: 12/042,309
Filed: Mar. 4, 2008

Certificate of Correction issued Dec. 4, 2012

(51) Int. Cl.
*G06F 3/041* (2006.01)

(52) U.S. Cl.
USPC ............................................. 345/173; 715/700

(58) Field of Classification Search
None
See application file for complete search history.

(56) References Cited

To view the complete listing of prior art documents cited during the proceeding for Reexamination Control Number 90/012,764, please refer to the USPTO's public Patent Application Information Retrieval (PAIR) system under the Display References tab.

*Primary Examiner* — Yuzhen Ge

(57) ABSTRACT

Methods, systems, and apparatus, including computer program products, for inputting text. A virtual keyboard is presented in a first region of a touch sensitive display of a device. An input representing a phonetic string is received on the virtual keyboard. The entered phonetic string is presented in a second region of the touch sensitive display. One or more candidates are identified based on the phonetic string. At least a subset of the candidates is presented. An input selecting one of the candidates is received. The entered phonetic string is replaced with the selected candidate.

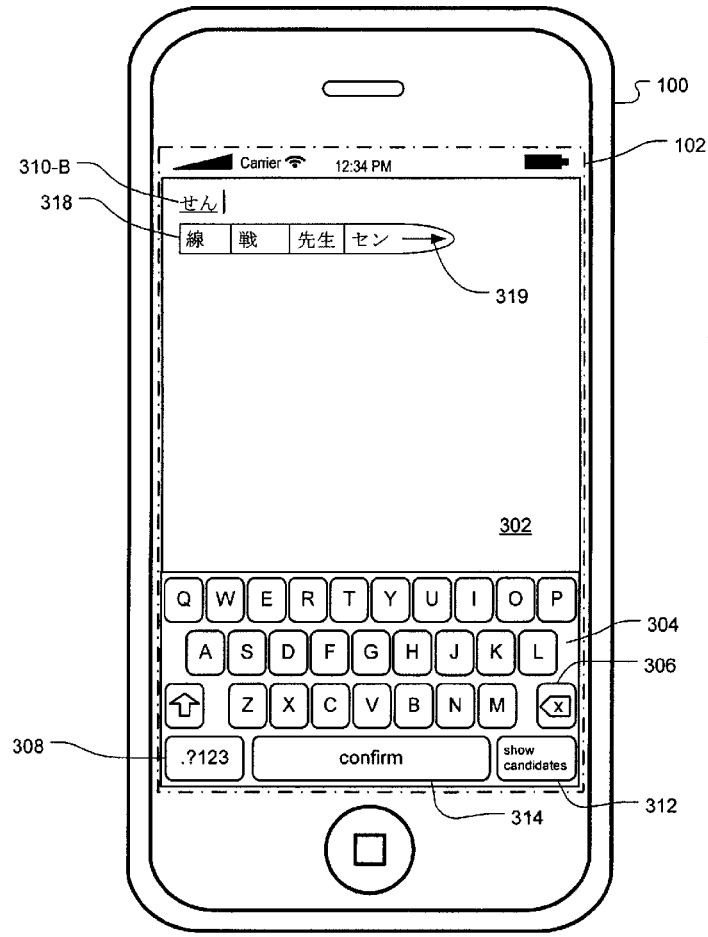

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-22 and 24-25 is confirmed.

New claims 29-115 are added and determined to be patentable.

Claims 23 and 26-28 were not reexamined.

*29. The method of claim 1, wherein presenting the candidate tray comprises presenting the candidate tray in the second region of the touch-sensitive display.*

*30. The method of claim 1, wherein replacing the entered phonetic string comprises replacing the entered phonetic string in the second region of the touch-sensitive display.*

*31. The method of claim 1, wherein presenting the candidate tray comprises presenting the candidate tray adjacent to the phonetic string.*

*32. The method of claim 1, wherein presenting the candidate tray comprises presenting the candidate tray adjacent to the phonetic string in the second region.*

*33. The method of claim 1, further comprising:*
*receiving an input on the virtual keyboard representing a second phonetic string;*
*presenting the second phonetic string in the second region of the touch-sensitive display; and*
*receiving an input confirming the second phonetic string.*

*34. The method of claim 1, further comprising:*
*presenting an option to expand the candidate tray to include a larger subset of the candidate representations.*

*35. The method of claim 1, further comprising:*
*providing a confirm key.*

*36. The method of claim 35, wherein the received input of a selected candidate representation comprises a number of hits to the confirm key in succession.*

*37. The method of claim 36, wherein each of the candidate representations presented in the candidate tray corresponds to a different number of hits of the confirm key.*

*38. The method of claim 1, further comprising:*
*providing an option of replacing the virtual keyboard in the first region with at least a subset of the candidate representations.*

*39. The method of claim 1, further comprising:*
*providing an option of presenting a different subset of the candidate representations in the candidate tray.*

*40. The method of claim 1, wherein presenting the phonetic string in the second region comprises:*
*displaying the phonetic string using a phonetic representation different from the first alphabet.*

*41. The method of claim 1, further comprising:*
*displaying a visual indicator that identifies the presented phonetic string as a provisional input.*

*42. The method of claim 1, wherein presenting the candidate tray comprises:*
*presenting the subset of candidate representations according to a text orientation associated with the second alphabet.*

*43. The method of claim 42, wherein the text orientation comprises a left to right orientation.*

*44. The method of claim 42, wherein the text orientation comprises a right to left orientation.*

*45. The method of claim 42, wherein the text orientation comprises a top to bottom orientation.*

*46. The method of claim 1, wherein the candidate tray includes a subset of additional candidate representations corresponding to a text that is different from the first and second alphabets.*

*47. The method of claim 46, wherein presenting the phonetic string in the second region comprises presenting the phonetic string in the text.*

*48. The method of claim 47, wherein the candidate tray includes a candidate representation corresponding to the first alphabet.*

*49. The method of claim 1, further comprising:*
*presenting a next candidate key configured to allow a user to select a next candidate of the one or more candidate representations.*

*50. The method of claim 1, further comprising:*
*presenting a previous candidate key configured to allow a user to select a previous candidate of the one or more candidate representations.*

*51. The device of claim 8, wherein the instructions to present the candidate tray include instructions to present the candidate tray in the second region of the touch-sensitive display.*

*52. The device of claim 8, wherein the instructions to replace the entered phonetic string include instructions to replace the entered phonetic string in the second region of the touch-sensitive display.*

*53. The device of claim 8, wherein the instructions to present the candidate tray include instructions to present the candidate tray adjacent to the phonetic string.*

*54. The device of claim 8, wherein the instructions to present the candidate tray comprise instructions to present the candidate tray adjacent to the phonetic string in the second region.*

*55. The device of claim 8, further comprising instructions to:*
*receive an input on the virtual keyboard representing a second phonetic string;*
*present the second phonetic string in the second region of the touch-sensitive display; and*
*receive an input confirming the second phonetic string.*

*56. The device of claim 8, further comprising instructions to:*
*present an option to expand the candidate tray to include a larger subset of the candidate representations.*

*57. The device of claim 8, further comprising instructions to:*
*provide a confirm key.*

*58. The device of claim 57, wherein the instructions to receive an input of a selected candidate representation include instructions to recognize a number of hits to the confirm key in succession.*

*59. The device of claim 58, further comprising instructions to:*
*associate each of the candidate representations presented in the candidate tray with a different number of hits of the confirm key.*

*60. The device of claim 8, further comprising instructions to:* provide an option of replacing the virtual keyboard in the first region with at least a subset of the candidate representations.

61. The device of claim 8, further comprising instructions to:
provide an option of presenting a different subset of the candidate representations in the candidate tray.

62. The device of claim 8 wherein the instructions to present the phonetic string in the second region comprise instructions to display the phonetic string using a phonetic representation different from the first alphabet.

63. The device of claim 8, further comprising instructions to:
display a visual indicator that identifies the presented phonetic string as a provisional input.

64. The device of claim 8, wherein the instructions to present the candidate tray comprise instructions to present the subset of candidate representations according to a text orientation associated with the second alphabet.

65. The device of claim 64, wherein the text orientation comprises a left to right orientation.

66. The device of claim 64, wherein the text orientation comprises a right to left orientation.

67. The device of claim 64, wherein the F comprises a top to bottom orientation.

68. The device of claim 8, wherein the candidate tray includes a subset of additional candidate representations corresponding to a text that is different from the first and second alphabets.

69. The device of claim 68 wherein the instructions to present the phonetic string in second region comprise instructions to present the phonetic string in the text.

70. The device of claim 68, wherein the candidate tray includes a candidate representation corresponding to the first alphabet.

71. The device of claim 8, further comprising instructions to present a next candidate key configured to allow a user to select a next candidate of the one or more candidate representations.

72. The device of claim 8, further comprising instructions to present a previous candidate key configured to allow a user to select a previous candidate of the one or more candidate representations.

73. The program product of claim 15, wherein presenting the candidate tray comprises presenting the candidate tray in the second region of the touch-sensitive display.

74. The program product of claim 15, wherein replacing the entered phonetic string comprises replacing the entered phonetic string in the second region of the touch-sensitive display.

75. The program product of claim 15, wherein presenting the candidate tray comprises presenting the candidate tray adjacent to the phonetic string.

76. The program product of claim 15, wherein presenting the candidate tray comprises presenting the candidate tray adjacent to the phonetic string in the second region.

77. The program product of claim 15, wherein the operations further comprise:
receiving an input on the virtual keyboard representing a second phonetic string;
presenting the second phonetic string in the second region of the touch-sensitive display; and
receiving an input confirming the second phonetic string.

78. The program product of claim 15, wherein the operations further comprise:
presenting an option to expand the candidate tray to include a larger subset of the candidate representations.

79. The program product of claim 15, wherein the operations further comprise:
providing a confirm key.

80. The program product of claim 79, wherein the received input of a selected candidate representation comprises a number of hits to the confirm key in succession.

81. The program product of claim 80, wherein each of the candidate representations presented in the candidate tray corresponds to a different number of hits of the confirm key.

82. The program product of claim 15, wherein the operations further comprise:
providing an option of replacing the virtual keyboard in the first region with at least a subset of the candidate representations.

83. The program product of claim 15, wherein the operations further comprise:
providing an option of presenting a different subset of the candidate representations in the candidate tray.

84. The program product of claim 15, wherein presenting the phonetic string in the second region comprises:
displaying the phonetic string using a phonetic representation different from the first alphabet.

85. The program product of claim 15, further comprising:
displaying a visual indicator that identifies the presented phonetic string as a provisional input.

86. The program product of claim 15, wherein presenting the candidate tray comprises presenting the subset of candidate representations according to a text orientation associated with the second alphabet.

87. The program product of claim 86, wherein the text orientation comprises a left to right orientation.

88. The program product of claim 86, wherein the text orientation comprises a right to left orientation.

89. The program product of claim 86, wherein the text orientation comprises a top to bottom orientation.

90. The program product of claim 15, wherein the candidate tray includes a subset of additional candidate representations corresponding to a text that is different from the first and second alphabets.

91. The program product of claim 90, wherein presenting the phonetic string in the second region comprises presenting the phonetic string in the text.

92. The program product of claim 90, wherein the candidate tray includes a candidate representation corresponding to the first alphabet.

93. The program product of claim 15, wherein the operations further comprise:
presenting a next candidate key configured to allow a user to select a next candidate of the one or more candidate representations.

94. The program product of claim 15, wherein the operations further comprise:
presenting a previous candidate key configured to allow a user to select a previous candidate of the one or more candidate representations.

95. The method of claim 22, wherein presenting the subset of candidate representations comprises presenting a candidate tray in the second region of the touch-sensitive display.

96. The method of claim 22, wherein replacing the entered phonetic string comprises replacing the entered phonetic string in the second region of the touch-sensitive display.

97. The method of claim 22, wherein presenting the subset of the candidate representations comprises presenting the candidate representations adjacent to the phonetic string.

98. The method of claim 22, wherein presenting the subset of candidate representations comprises presenting the candidate representations adjacent to the phonetic string in the second region.

99. The method of claim 22, further comprising:
receiving an input on the virtual keyboard representing a second phonetic string;
presenting the second phonetic string in the second region of the touch-sensitive display; and
receiving an input confirming the second phonetic string.

100. The method of claim 22, further comprising:
presenting an option to expand the subset of the candidate representations.

101. The method of claim 22, further comprising:
providing a confirm key.

102. The method of claim 101, wherein the received input of a selected candidate representation comprises a number of hits to the confirm key in succession.

103. The method of claim 102, wherein each of the candidate representations corresponds to a different number of hits of the confirm key.

104. The method of claim 22, further comprising:
providing an option of replacing the virtual keyboard in the first region with at least a subset of the candidate representations.

105. The method of claim 22, further comprising:
providing an option of presenting a different subset of the candidate representations.

106. The method of claim 22, wherein presenting the phonetic string in the second region comprises:
displaying the phonetic string using a phonetic representation different from the first alphabet.

107. The method of claim 22, further comprising:
displaying a visual indicator that identifies the presented phonetic string as a provisional input.

108. The method of claim 22, wherein the orientation of text comprises a left to right orientation.

109. The method of claim 22, wherein the orientation of text comprises a right to left orientation.

110. The method of claim 22, wherein the orientation of text comprises a top to bottom orientation.

111. The method of claim 22, wherein the subset of candidate representations comprises additional candidate representations corresponding to a text that is different from the first and second alphabets.

112. The method of claim 111, wherein presenting the phonetic string in the second region comprises presenting the phonetic string in the text.

113. The method of claim 111, wherein the candidate tray includes a candidate representation corresponding to the first alphabet.

114. The method of claim 22, further comprising:
presenting a next candidate key configured to allow a user to select a next candidate of the one or more candidate representations.

115. The method of claim 22, further comprising:
presenting a previous candidate key configured to allow a user to select a previous candidate of the one or more candidate representations.

* * * * *